(12) United States Patent
Cohen

(10) Patent No.: US 12,474,015 B2
(45) Date of Patent: Nov. 18, 2025

(54) FENCE MOUNT

(71) Applicant: Maxiiimus Creations, Kirkland, WA (US)

(72) Inventor: Matthew T. Cohen, Kirkland, WA (US)

(73) Assignee: Maxiiimus Creations, Kirkland, WA (US)

( * ) Notice: Subject to any disclaimer, the term of this patent is extended or adjusted under 35 U.S.C. 154(b) by 203 days.

(21) Appl. No.: 18/527,440

(22) Filed: Dec. 4, 2023

(65) Prior Publication Data

US 2025/0180158 A1    Jun. 5, 2025

(51) Int. Cl.
  *F16M 13/02*    (2006.01)
(52) U.S. Cl.
  CPC ................. *F16M 13/022* (2013.01)
(58) Field of Classification Search
  CPC ....................... F16M 13/022; E05C 19/14–145
  See application file for complete search history.

(56) References Cited

U.S. PATENT DOCUMENTS

| | | | | |
|---|---|---|---|---|
| 6,244,759 B1 * | 6/2001 | Russo | ................. | G03B 17/563 |
| | | | | 396/419 |
| 9,188,280 B2 * | 11/2015 | Congdon | ............. | F16M 13/022 |
| 9,201,291 B2 * | 12/2015 | Jorgenson | ............ | G03B 17/561 |
| 10,161,429 B2 * | 12/2018 | Goffman | ................ | F16M 11/10 |
| 10,228,002 B2 * | 3/2019 | Fletcher | ................ | F16M 13/022 |
| 11,555,577 B2 * | 1/2023 | Park | ........................ | F16B 2/185 |

FOREIGN PATENT DOCUMENTS

| | | | | | |
|---|---|---|---|---|---|
| JP | 2011511213 A | * | 4/2011 | ................ | F16B 2/10 |
| JP | 2019049279 A | * | 3/2019 | | |

* cited by examiner

*Primary Examiner* — Leon W Rhodes, Jr.
(74) *Attorney, Agent, or Firm* — Josiah Barbour

(57) ABSTRACT

Camera fence mounts allow for easy video recording of activities such as sporting events. Mounting a camera on a fence allows for hands-free recording without the hassle of a tripod. Herein we describe a device used to mount a camera upon a fence. Typically, the device has a main body with additional attachments containing a fixed hook and a movable hook and a 4001-style toggle latch to fix the movable hook into place and attach the device to a fence. A camera is attached to the device via a ¼"-20 photography attachment that is connected to the movable hook.

19 Claims, 5 Drawing Sheets

FENCE MOUNT

BACKGROUND

Field of the Invention

The present invention relates generally to products for mounting a device on a fence. More specifically, the present invention relates to a product for mounting a camera of some type upon a chain link fence.

Description of the Related Art

Current fence mounts are divided into two types, those that simply hang on a fence and those that attach to the fence through a means beyond gravity. The type that hang on a fence typically have hooks made from wires, elastic cord, or metal brackets or other attachments that secure the mount to the fence through the use of gravity. These attachments may be at the top of a fence, such as to hang over the top rail of a fence or may attach to the body of the fence itself. There may be additional securing mechanisms to ensure the safety of the mount if it were to fall off the fence. However, there is no locking mechanism typical of these that will securely attach the mount to the fence in an immovable fashion. This can lead to mounts that can easily fall off the fence if they are jostled or the fence is under duress from contact, such as would happen at a sporting event.

Of the fence mounts that use a means beyond gravity to attach to the fence, a number of different styles are available. Some use a "grab-and-hold" type attachment where hooks are used a distance apart from each other where the hooks can be tightened together to pull on the fence such that the mount is secured. Others use the inverse, an "expand-and-hold" type attachment such that the mount will expand out attachments to secure the mount on a fence through expansive force. Another used method is to use clamps with tightening threads which can be tightened onto a fence to secure the mount onto the fence. Hook and loop fasteners are also used to secure a mount to a fence. These mount types can still be displaced via jostling of the mount itself or movement of the fence. Additionally, not all of these fastener types will hold the mount in a single position, such as hook and loop, as the mount may still be affected by outside forces in ways that will move it.

SUMMARY

In accordance with the embodiments here, a device for mounting a camera upon a chain link fence is disclosed. The device described herein generally includes a main body upon which a mounting block is attached along with a pair of hooks used to connect the body of the device to the chain link fence. Typically, a 4001-style toggle latch is used to draw the two hooks together and latch the hooks in place to ensure the stability of the mount upon the fence.

DETAILED DESCRIPTION OF EMBODIMENTS

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions without departing from the spirit and scope of the invention.

Figure 1:
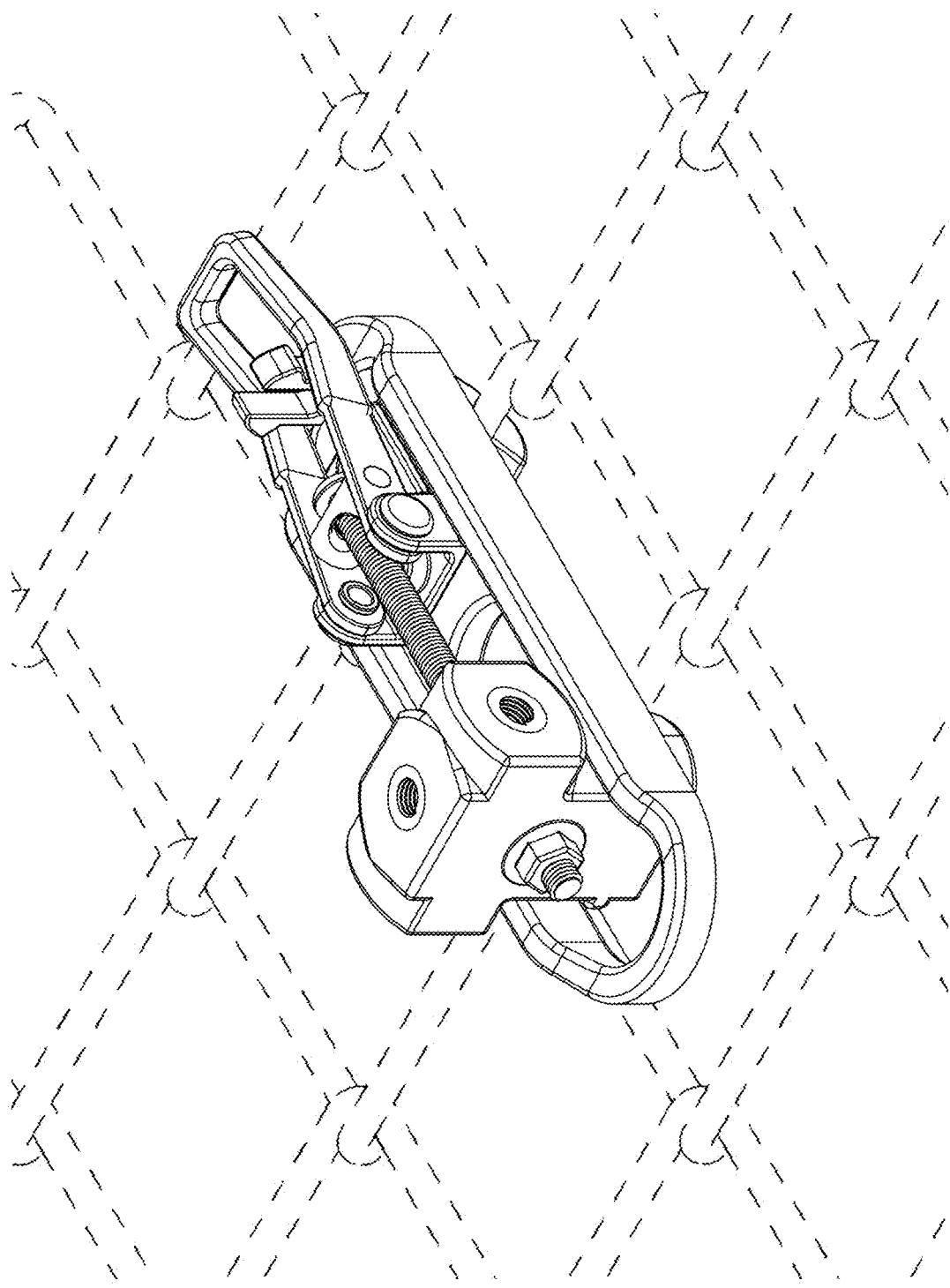
FIG. 1 provides a view of the device when it is attached to a chain link fence.
Figure 2:
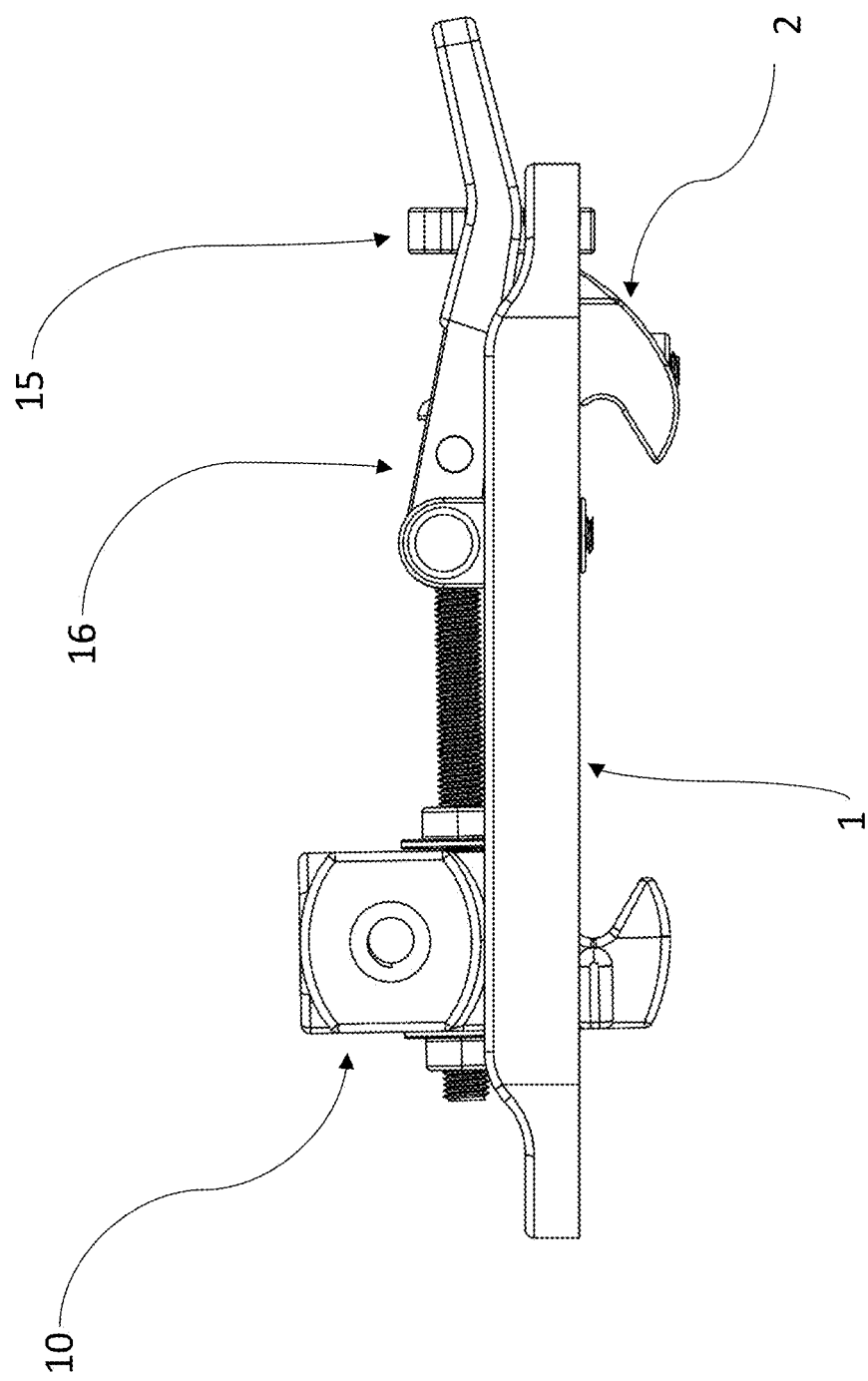
FIG. 2 provides a view of the device in the closed position.
Figure 3:
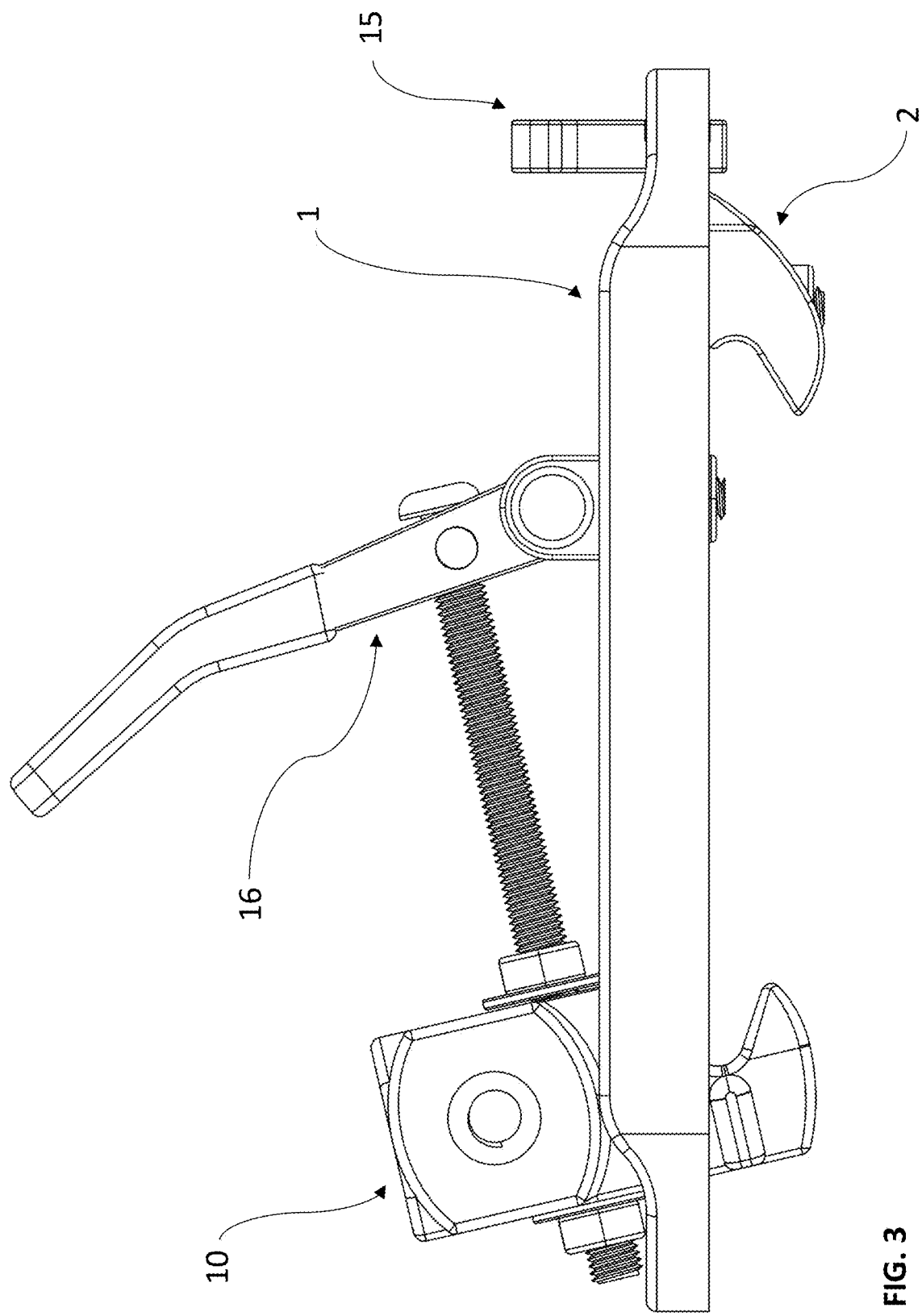
FIG. 3 provides a view of the device in the open position.

Most frequently, the device would be used to attach a camera to a chain link fence. FIG. 1 shows this embodiment of the invention. When operating the device, the 4001-style toggle latch would be closed to lock the device into place on the fence, as shown in FIG. 2. FIG. 3 shows the 4001-style toggle latch in the open position to be able to place the device upon a fence in a desired position. The 4001-style toggle latch and the angled shape of the hooks allow the device to lock into place in a manner that is heretofore unseen in the prior art. This type of locking is substantially more secure than the prior art as even a great amount of force applied to the mount or to the fence will not remove the mount. This design presses the entire main body of the mount firmly against the fence in a manner that is unseen in the prior art.

Figure 4:
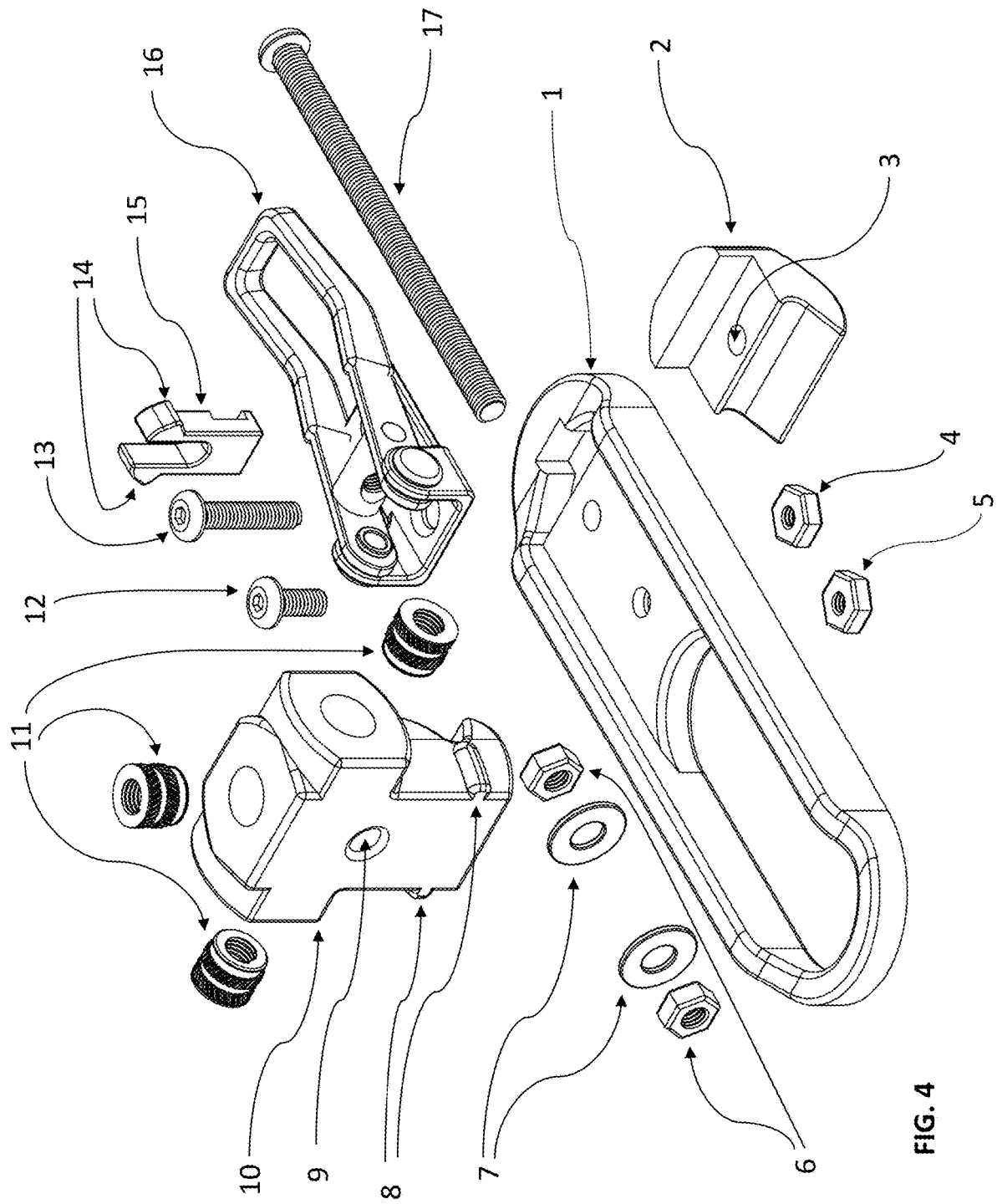
FIG. 4 provides an exploded view of the device.
Figure 5:
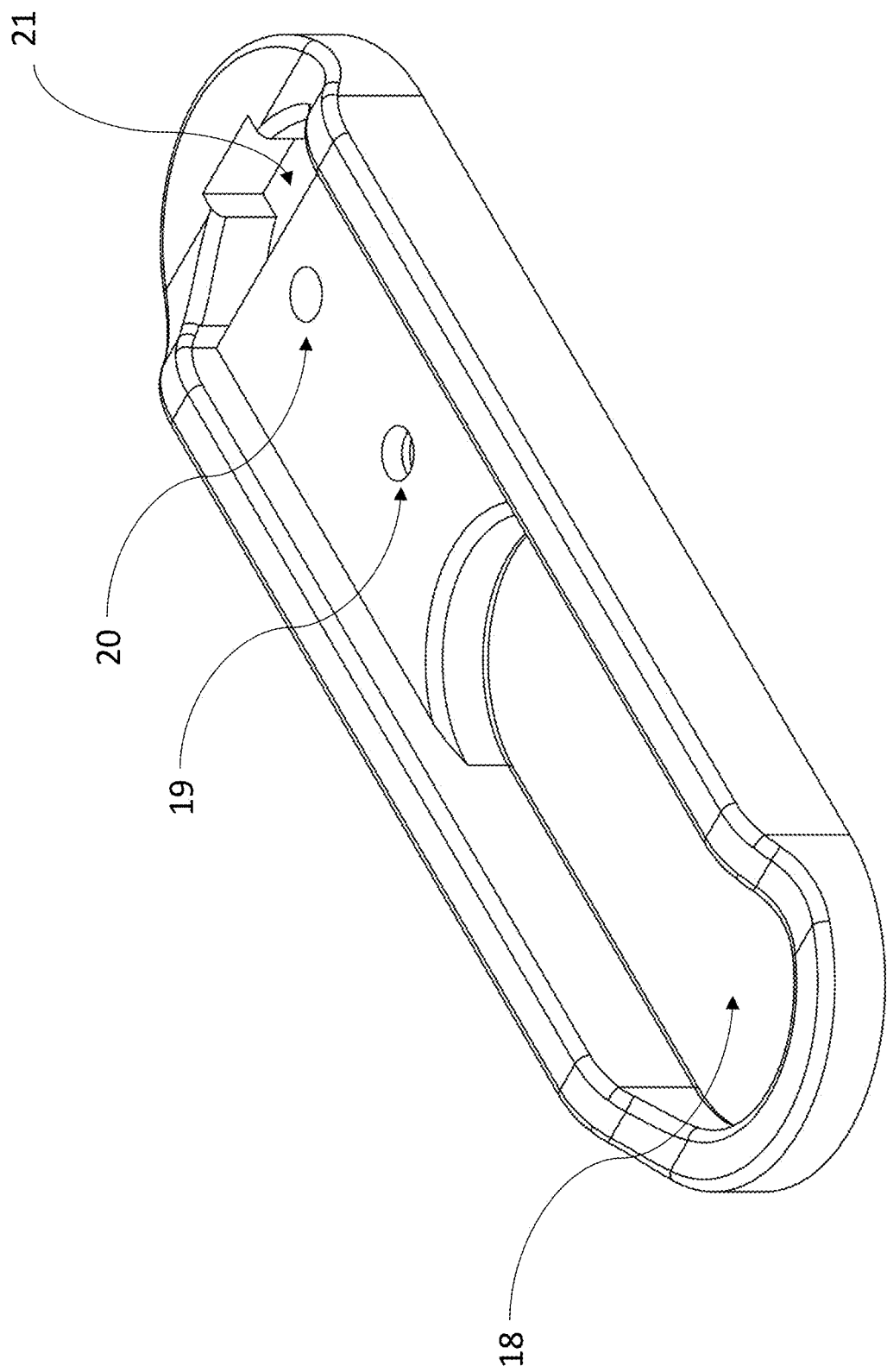
FIG. 5 provides a view of the main body of the device.

In an illustrative embodiment of the invention, as shown in FIG. 4, there is a main body 1. Main body 1 is expanded upon in FIG. 5. Main body 1 has an ovular hole 18 at one end, two circular holes, 19 and 20, along the main body and a final hole 21 at the opposed end from the ovular hole. Typically hole 21 will have a notch within, but this is not required.

Continuing back with FIG. 4, stationary hook 2 has a projection perpendicular to the hook shape that is shaped such that it fits within hole 21 and has a circular hole 3 through it that connects with circular hole 20 in main body 1. The end of stationary hook 2 opposed to the projection will be shaped into a hook such that it can connect with a chain link fence. The typical shape of hooks for this type of device is a rough "C" shape for the hook. However, the shape of the hook for stationary hook 2 is such that it is shaped in an inverse "J" shape with a straight shank and slightly curved bend to accommodate the structure of the fence. This structural shape to stationary hook 2 leads to a more secure attachment to the fence.

Mounting block 10 is provided such as it will movably fit within hole 18. Mounting block 10 is shaped such that it can accept a number of ¼"-20 photography attachments 11, with three (3) ¼"-20 photography attachments being the most common embodiment. The end opposed to the ¼"-20 photography attachments is shaped into a hook to allow a movable connection with a chain link fence, functioning with stationary hook 2 to ensure a locked fit upon the chain link fence. Similar to the hook shape of stationary hook 2, the hook shape of mounting block 10 is such that it is shaped in an "J" shape with a straight shank and slightly curved bend to accommodate the structure of the fence. Circular hole 9 is roughly midline of the mounting block. In some embodiments mounting block 3 has a pair of protrusions 8 parallel to circular hole 9 to ensure the stability of mounting block 10 and to prevent mounting block 10 from passing through hole 18. While mounting block 10 is within hole 18, the connection with main body 1 is such that mounting block 10 is able to move within hole 18. This allows for mounting block 10 to be adjustable to fit differing dimensions of a fence and still maintain a secure attachment.

Safety clip 15 is present in some embodiments. If safety clip 15 is present, it will fit into a notch in hole 21 and be held in place by stationary hook 2. Typically, safety clip 15 has the flexibility and strength to ensure that 4001-style toggle latch 16 will remain closed and assist with locking the 4001-style toggle latch in the closed position to ensure maximum safety and security of the mount when attached to a fence. Most frequently, safety clip 15 has flexible protrusions 14 to hold the arm of 4001-style toggle latch 16 in place while the latch is closed.

A commercially available 4001-style toggle latch 16 is connected to main body 1 and stationary hook 2 using bolt 13 and nut 4 via hole 20 in the main body and hole 3 in stationary hook 2 and to main body 1 via bolt 12 and nut 5 via hole 19. Bolt 17 passes through 4001-style toggle latch 16 and circular hole 9 in mounting block 10. Bolt 17 is secured in place via a pair of nuts 6 and washers 7 on either side of the mounting block 10. Bolt 17 is of sufficient length to allow for the adjustable fit of mounting block 10 within hole 18. Nuts 6 secure mounting block 10 in a fixed position in hole 18 once the requisite length between mounting block 10 and stationary hook 2 is determined to have an appropriate fit of the fence mount for the fence upon which it is mounted.

In other embodiments of the device, the nuts, washers, and bolts can be replaced with screws.

Typically, where nuts are used, hexagonal insets will be available to allow the nuts to sit inset into the device to allow a smooth face, instead of having the nut sticking out beyond the surface of the device. However, this embodiment is not required.

What is claimed is:

1. A device, comprising:
    a main body, wherein the main body has a first aperture at a first end and is shaped as an oval, a second aperture that is smaller than the first aperture at a second end opposite the first end, a third aperture smaller than both the first and second apertures and situated between the first and second apertures but closer to the first aperture than the second aperture and is circular in shape, and a fourth aperture in roughly equal size to the third aperture and situated between the first and second apertures but closer to the second aperture than the first aperture and is circular in shape;
    a mounting block, wherein the mounting block has at least one ¼"-20 photography attachment at a first end of the mounting block, a first hook shape at a second end of the mounting block opposite the first end, and a circular aperture roughly equidistant between the first and second ends;
    a stationary hook, wherein the stationary hook has a second hook shape at a first end, a projection from the stationary hook at a second end opposite the first end and perpendicular to the hook shape, and a circular aperture passing through the stationary hook parallel to the projection, wherein the shape of the projection is such that it fits within the second aperture of the main body;
    and a toggle latch, wherein the toggle latch comprises a first toggle latch aperture, a second toggle latch aperture, a pivotably mounted u-shaped arm, a rotational beam having a rotational beam aperture set between the sides of the u-shaped arm, and an adjustable attachment member passing through the rotational beam aperture;
    wherein the mounting block is inserted into the first aperture of the main body such that the first hook shape of the mounting block is directed centrally of the main body, the stationary hook is inserted in the second aperture of the main body such that the projection of the stationary hook is through the main body and the second hook shape of the stationary hook is oriented such that it could engage with the hook shape of the mounting block; and the toggle latch is mounted to the main body on a side opposite the first and second hook shapes of the mounting block and stationary hook such that when the toggle latch is closed the arm of the latch is oriented towards the stationary hook; and
    wherein the third aperture of the main body aligns with a first aperture of the first toggle latch aperture to allow a first holdfast connection securing the toggle latch to the main body, the fourth aperture of the main body aligns with the circular aperture of the stationary hook and the second toggle latch aperture of the toggle latch to allow a second holdfast connection securing the toggle latch and the stationary hook to the main body; and the circular aperture of the mounting block aligns with the rotational beam aperture to allow an adjustable attachment of the mounting block within the main body via the adjustable attachment member.

2. The device of claim 1, wherein the holdfast connections are selected from the group consisting of screws and bolts and nuts.

3. The device of claim 2, wherein a washer is used for at least one of the holdfast connections.

4. The device of claim 1, wherein the adjustable attachment of the mounting block is created using a bolt with a washer and nut on each side of the mounting block as the adjustable attachment member.

5. The device of claim 1, wherein the third aperture of the main body and the circular aperture of the stationary hook have hexagonal insets to fit a nut.

6. The device of claim 1, wherein there are three ¼"-20 photography attachments within the mounting block.

7. The device of claim 1, further comprising a safety clip which can be inserted into a notch in the second aperture of the main body and the alignment of the safety clip within the second aperture of the main body is such that the stationary hook holds the safety clip in position, and wherein the safety clip has sufficient flexibility and strength to hold the toggle latch in place when the latch is closed.

8. The device of claim 7, wherein the safety clip has flexible protrusions which hold the arm of the toggle latch in place when the latch is closed.

9. The device of claim 1, wherein the mounting block has protrusions on sides perpendicular to the circular aperture to prevent the mounting block from passing through the first aperture of the main body.

10. A device, comprising:
    a main body, wherein the main body has an oval-shaped first aperture at a first end;
    a toggle latch positioned on the main body, wherein the toggle latch comprises a pivotably mounted u-shaped arm, a rotational beam having an aperture set between the sides of the u-shaped arm, and an adjustable attachment member passing through the aperture of the rotational beam;
    a mounting block, wherein the mounting block has at least one camera attachment point at a first end of the mounting block, a first hook shape at a second end of the mounting block opposite the first end, and a connection for the adjustable attachment member located roughly equidistant between the first and second ends;

a stationary hook positioned on the main body at a side opposite the toggle latch and a second end opposite the first end, wherein the stationary hook has a second hook shape;

wherein the mounting block is inserted into the first aperture of the main body such that the first hook shape of the mounting block is directed centrally of the main body at a side opposite the toggle latch and hooked towards the stationary hook, the toggle latch is positioned such that when the toggle latch is closed the arm of the toggle latch is oriented towards the second end of the main body, the adjustable attachment member is attached to the mounting block at the connection, and when the toggle latch is moved from an open position to a closed position the adjustable attachment member causes the mounting block to be moved within the first aperture of the main body towards the stationary hook such that the device may be secured to an object.

11. The device of claim 10, wherein at least one of the toggle latch and the stationary hook are formed as a separate member attached to the main body by one or more screws, bolts, or nuts.

12. The device of claim 11, wherein a washer is used to attach the toggle latch and/or the stationary hook.

13. The device of claim 10, wherein the adjustable attachment member is a threaded member with two nuts threaded thereon, the connection for the adjustable attachment member of the mounting block is a hole passing through the mounting block, and the mounting block is secured to the threaded member by the threaded member passing through the hole and the two nuts being positioned on each side of the mounting block.

14. The device of claim 13, wherein a washer is positioned between each of the nuts and the mounting block.

15. The device of claim 10, wherein the camera attachment point comprises a ¼"-20 internally threaded opening.

16. The device of claim 10: wherein the camera attachment point includes three separate camera attachment positions.

17. The device of claim 10, further comprising a safety clip having sufficient flexibility and strength to hold the toggle latch in a closed position.

18. The device of claim 17, wherein the safety clip has flexible protrusions which hold the arm of the toggle latch in place when the latch is closed.

19. The device of claim 10, wherein the mounting block has protrusions on sides to prevent the mounting block from passing through the first aperture of the main body.

* * * * *